(12) United States Patent
Ross

(10) Patent No.: US 9,983,040 B2
(45) Date of Patent: May 29, 2018

(54) MEASURING APPARATUS—ALL IN ONE MEASURING COMPONENTS EMBEDDED IN ONE STRUCTURE

(71) Applicant: Mark Ross, Merriam, KS (US)

(72) Inventor: Mark Ross, Merriam, KS (US)

(*) Notice: Subject to any disclaimer, the term of this patent is extended or adjusted under 35 U.S.C. 154(b) by 0 days. days.

(21) Appl. No.: 14/757,880

(22) Filed: Dec. 24, 2015

(65) Prior Publication Data
US 2016/0187177 A1    Jun. 30, 2016

Related U.S. Application Data

(60) Provisional application No. 62/097,404, filed on Dec. 29, 2014.

(51) Int. Cl.
    *G01F 19/00*        (2006.01)

(52) U.S. Cl.
    CPC ............ *G01F 19/002* (2013.01); *G01F 19/00* (2013.01)

(58) Field of Classification Search
    CPC ........................................................ G01F 19/00
    USPC ............................................................ 73/427
    See application file for complete search history.

(56) References Cited

U.S. PATENT DOCUMENTS

| | | | | |
|---|---|---|---|---|
| 2,096,825 | A * | 10/1937 | Roman ................... | A47G 19/02 126/246 |
| 2,526,602 | A * | 10/1950 | Crumrine .............. | G01F 19/002 206/305 |
| 3,228,776 | A * | 1/1966 | Savage ................. | B65B 25/001 426/114 |
| 3,406,461 | A * | 10/1968 | Harry ...................... | G01B 3/40 33/199 R |
| 3,498,136 | A * | 3/1970 | Le May .................. | G01F 19/00 312/202 |
| 3,808,892 | A * | 5/1974 | Litton .................... | G01F 19/002 220/DIG. 5 |
| 4,138,820 | A * | 2/1979 | O'Connor ................ | G01B 3/34 33/199 R |
| 4,165,565 | A * | 8/1979 | Cloutier ................ | G01F 19/007 33/524 |
| 9,055,844 | B2 * | 6/2015 | Schuelke ................ | B65D 25/48 |
| 2002/0083615 | A1 * | 7/2002 | Giblin ................... | D06F 58/203 34/595 |
| 2015/0285679 | A1 * | 10/2015 | Kasiutsich ......... | G01N 21/3504 356/402 |

* cited by examiner

*Primary Examiner* — Harshad R Patel
*Assistant Examiner* — Jamel Williams
(74) *Attorney, Agent, or Firm* — Shook, Hardy & Bacon, LLP

(57) ABSTRACT

An all-in-one measuring tool. has multiple measuring components embedded into a structure of any shape or size. The measuring components are positioned at various locations along the surface of the structure. Each measuring component is unique and can hold an amount of liquid or ingredient that is identified by a particular measurement. The measuring components can respectively include handles to enable a user to hold the measuring components.

5 Claims, 4 Drawing Sheets

MEASURING APPARATUS—ALL IN ONE MEASURING COMPONENTS EMBEDDED IN ONE STRUCTURE

CROSS-REFERENCE TO RELATED APPLICATIONS

This application claims the benefit of U.S. Patent Application No. 62/097,404 filed on Dec. 29, 2014 under 35 U.S.C. § 119(e), which is incorporated herein by reference in its entirety.

TECHNICAL FIELD

The present invention relates to a device that can measure different amounts of liquid or ingredients.

BACKGROUND

Measuring spoons and measuring cups are used in kitchens to measure correct quantities of ingredients. Many variations of measuring spoons are available on the market. There are separate spoons, each with a different measuring quantity. There are some all-in-one spoons where one can vary the measuring quantities in one spoon.

A set of separate spoons takes up extra space when being stored. Additionally, all the spoons in the set have to be washed individually, one by one. All-in-one spoons are hard to wash, and sometimes have problems measuring liquid ingredients correctly. As a result, an apparatus is needed that can overcome these deficiencies that would allow for minimum use of space, ease of cleaning, and accuracy of measurement.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the invention detail an all-in-one measuring apparatus. The measuring apparatus has several measuring components that measure individual amounts of liquids or ingredients.

In a first aspect, an apparatus for measuring liquids or ingredients of various sizes is provided that includes a structure comprising a plurality of recessed cavities. Each recessed cavity has a unique size relative to other recessed cavities in the structure. Each recessed cavity holds an amount equivalent to a particular volume measurement. The plurality of recessed cavities is dispersed uniformly about the structure.

In a second aspect, an apparatus for measuring liquids or ingredients of various sizes is provided that includes a structure comprising a plurality of openings. Each opening holds a cup-like receptacle containing a hinged handled such that the cup-like receptacle with the hinged handle is embedded in the structure such that only a face of the cup-like receptacle is exposed. Each cup-like receptacle has a unique size relative to other cup-like receptacles in the structure. Each cup-like receptacle holds an amount equivalent to a particular volume measurement. The cup-like receptacles with their corresponding openings are dispersed uniformly about the structure.

In a third aspect, an apparatus for measuring liquids or ingredients of various sizes is provided that includes a measuring tool comprising a plurality of measuring cups. Each measuring cup has a unique size relative to other measuring cups in the measuring tool. Each measuring cup holds an amount equivalent to a particular volume measurement. The plurality of measuring cups is embedded in a surface of the measuring tool and located uniformly about the surface of the measuring tool.

BRIEF DESCRIPTION OF THE DRAWINGS

Embodiments of the invention are illustrated by way of example and not limited in the accompanying figures in which like reference numerals indicate similar elements and in which.

DETAILED DESCRIPTION

The subject matter of the embodiments of the invention is described with specificity herein to meet statutory requirements. However, the description itself is not intended to limit the scope of this patent. Rather, the inventor has contemplated that the claimed subject matter also might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

In a first aspect, an apparatus for measuring liquids or ingredients of various sizes is provided that includes a structure comprising a plurality of recessed cavities. Each recessed cavity has a unique size relative to other recessed cavities in the structure. Each recessed cavity holds an amount equivalent to a particular volume measurement. The plurality of recessed cavities is dispersed uniformly about the structure.

In a second aspect, an apparatus for measuring liquids or ingredients of various sizes is provided that includes a structure comprising a plurality of openings. Each opening holds a cup-like receptacle containing a hinged handled such that the cup-like receptacle with the hinged handle is embedded in the structure such that only a face of the cup-like receptacle is exposed. Each cup-like receptacle has a unique size relative to other cup-like receptacles in the structure. Each cup-like receptacle holds an amount equivalent to a particular volume measurement. The cup-like receptacles with their corresponding openings are dispersed uniformly about the structure.

In a third aspect, an apparatus for measuring liquids or ingredients of various sizes is provided that includes a measuring tool comprising a plurality of measuring cups. Each measuring cup has a unique size relative to other measuring cups in the measuring tool. Each measuring cup holds an amount equivalent to a particular volume measurement. The plurality of measuring cups is embedded in a surface of the measuring tool and located uniformly about the surface of the measuring tool.

Embodiments of the invention disclose a measuring apparatus that includes measuring components contained within the measuring apparatus. The measuring apparatus can take the shape of many forms. However, various measured amounts can be obtained from the measuring components located within the measuring apparatus.

Figure 1:
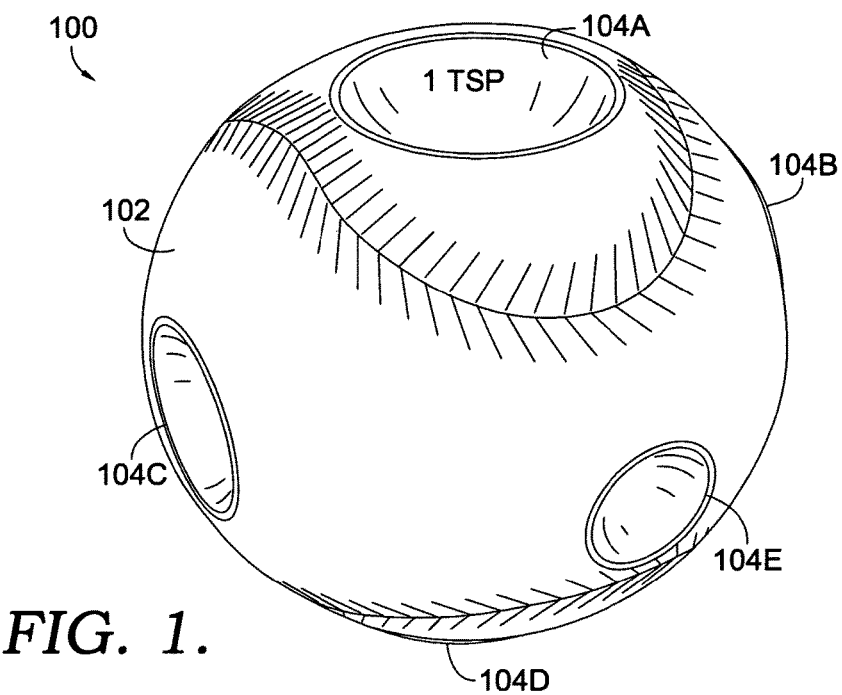
FIG. 1 is an illustration of an exemplary measuring tool in the shape of a baseball.

FIG. 1 discloses a measuring tool 100 that includes a round structure 102. Round structure 102 includes various measuring cups 104A, 104B, 104C, 104D, and 104E where the measuring cups vary in sizes. Multiple measuring cups or spoons can be embedded into round structure 102 so that all measuring cups or spoons are available for use in one tool. For example, measuring cup 104A is embedded into round structure 102. Measuring cups 104A, 104B, 104C, 104D, and 104E can be embedded into a variety of shapes, such as a baseball as shown in FIG. 1. Further, round structure 102 can stand on its own with one of the measuring cups or spoons, such as measuring cup 104D, touching the surface on which it stands on. Although illustrated with measuring cups 104A, 104B, 104C, 104D, and 104E, round structure 102 can include more or less measuring cups than the ones shown.

Figure 2:
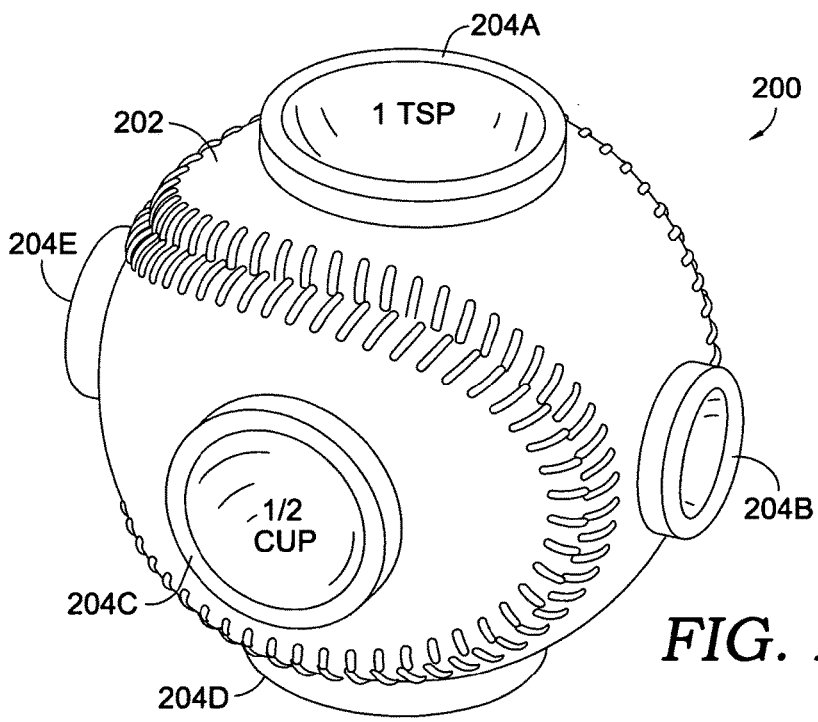
FIG. 2 is another illustration of an exemplary measuring tool in the shape of a baseball.

Turning now to FIG. 2, a measuring tool 200 is shown that includes a round structure 202. Round structure 202 includes various measuring components 204A, 204B, 204C, 204D, and 204E, where the measuring components vary in sizes. The measuring components refer to measuring cups, spoons, recessed cavities, cup-like receptacles, or any other similar component that holds a liquid or ingredient. Correspondingly, the measuring cups, spoons, recessed cavities, or cup-like receptacles vary in size to accommodate different amounts of liquids or ingredients. For the sake of brevity, measuring cups, spoons, recessed cavities, and cup-like receptacles shall be referred to as measuring components. These measuring components are embedded in openings dispersed around round structure 202. The openings in round structure 202 can have the same or different sizes, even though each measuring component has a different size.

Measuring tool 200 is similar to measuring tool 100. In some embodiments, measuring tool 200 has an inscription of the amount of measurement positioned in measuring component 204C. Likewise, all the other measuring components have a similar inscription for the amount of liquid or ingredient they can hold. Additionally, measuring tool 200 includes measuring components that protrude slightly more pronounced about the surface of round structure 202 than measuring cups in round structure 102. Overall, the object of the invention is the same. Measuring tools 100 and 200 provide a device that is used to measure varying amounts of liquids or ingredients in one structure.

Figure 3:
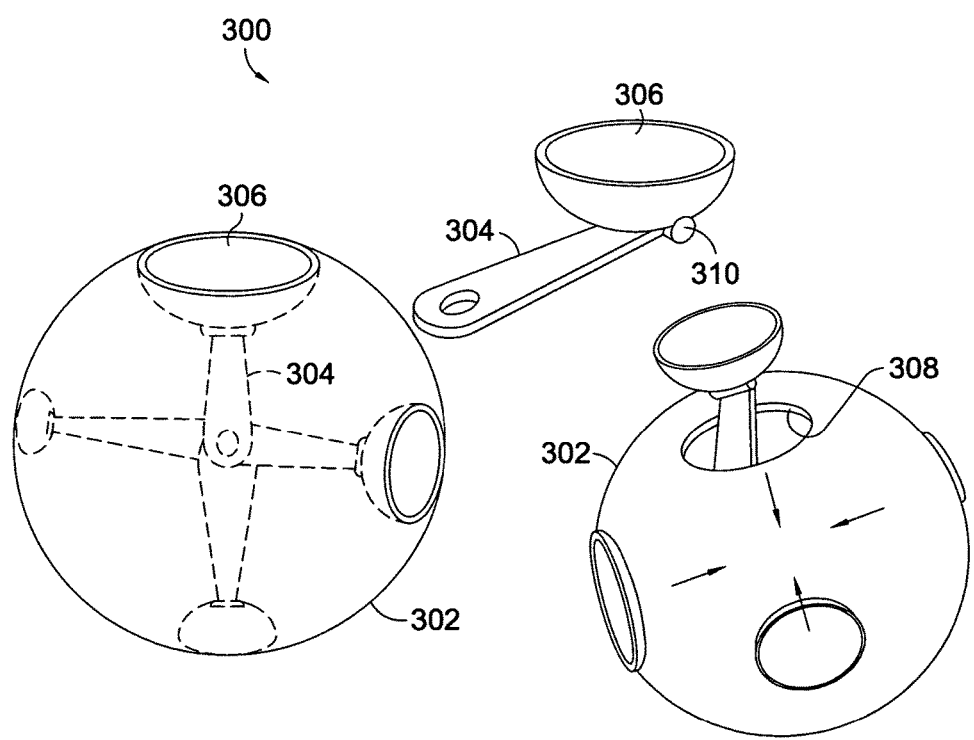
FIG. 3 is a diagram of an exemplary measuring tool with hinged measuring cups.

In FIG. 3, an illustrative representation of measuring tools 100 and 200 is shown as measuring tool 300. Measuring tool 300 has a built-in spoon system with a handle 304 in accordance with embodiments of the invention. As illustrated, multiple measuring spoons 306 are embedded in a structure 302 that has a ball-like appearance. Structure 302 can take on different shapes, but the ball-like appearance is provided here as an exemplary embodiment. Measuring tool 300 can be developed with or without handles 304. In other words, measuring spoons 306 can come with or without handles 304. When measuring spoons 306 come with handles 304, handles 304 rest in a position inside structure 302 while the respective faces of spoons 306 are exposed outwardly and visible with structure 302. This means that structure 302 will contain a hollow interior or hollow space to receive handles 304 or any other items. Furthermore, while inside structure 302, handles 304 remain straight, or in other words, remain in a position where the handle is radially connected to the back side of the center of the measuring spoon. Handles 304 can be placed in this "straight" position in structure 302, as shown in FIG. 3, with the aid of a hinge 310, which is positioned between handle 304 and measuring spoon 306. When measuring spoon 306 is removed from structure 302, measuring spoon 306 can be rotated at hinge 310 to a position where a user can hold handle 304 in one hand to receive a liquid or scoop an ingredient into measuring spoon 306. Similar to FIGS. 1 and 2, openings 308 are dispersed around structure 302. The openings in structure 308 can have a same or different size.

Figure 4:
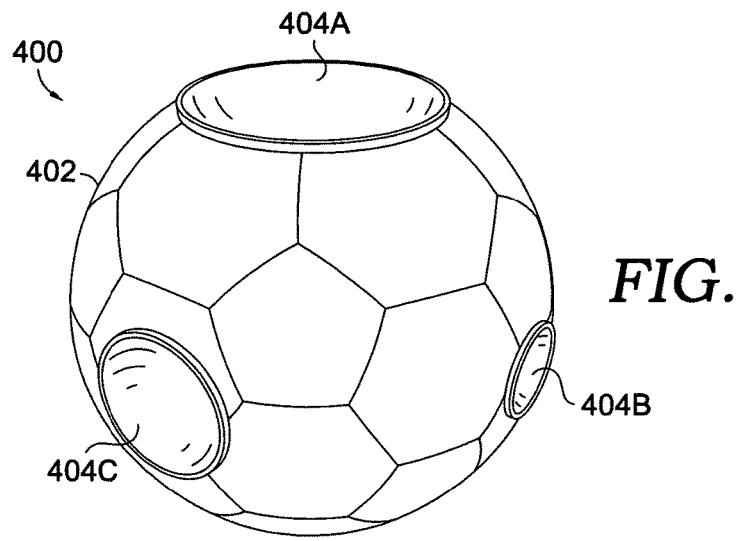
FIG. 4 is another illustration of an exemplary measuring tool in the shape of a soccer ball.

Turning now to FIG. 4, a measuring tool 400 includes a soccer ball shape 402. Soccer ball shape 402 includes a plurality of measuring components 404A, 404B, and 404C. As discussed above, measuring tool 400 may have a varying number of measuring components, which can be more or less than the ones shown in FIG. 4. Additionally, measuring components 404A, 404B, and 404C vary in size to reflect a unique amount of measurement. Measuring components 404A, 404B, and 404C are located dispersed about soccer ball shape 402.

Figure 5:
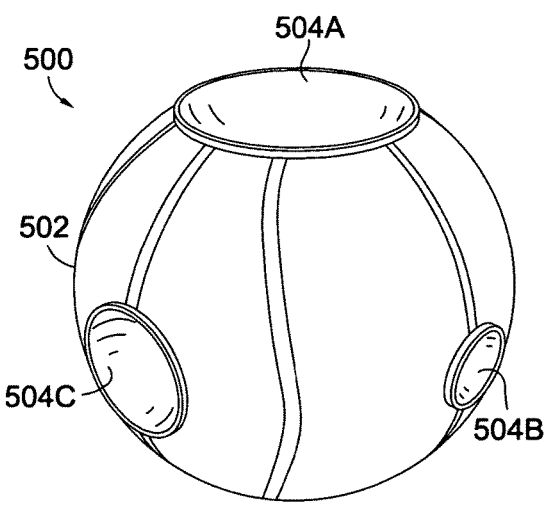
FIG. 5 is another illustration of an exemplary measuring tool in the shape of a basketball ball.

In FIG. 5, a measuring tool 500 includes a basketball shape 502. Basketball shape 502 includes a plurality of measuring components 504A, 504B, and 504C. As discussed above, measuring tool 500 may have a varying number of measuring components, which can be more or less than the ones shown in FIG. 5. Additionally, measuring components 504A, 504B, and 504C vary in size to reflect a unique amount of measurement. Measuring components 504A, 504B, and 504C are located dispersed about basketball shape 502.

Figure 6:
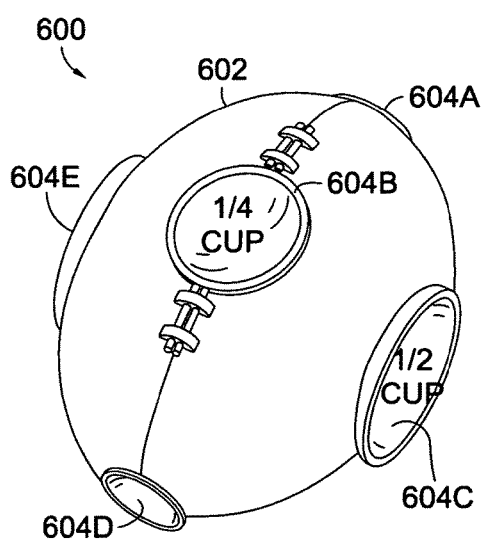
FIG. 6 is another illustration of an exemplary measuring tool in the shape of a football ball.

Turning to FIG. 6, a measuring tool 600 includes a football shape 602. Football shape 602 includes a plurality of measuring components 604A, 604B, 604C, 604D, and 604E. As discussed above, measuring tool 600 may have a varying number of measuring components, which can be more or less than the ones shown in FIG. 6. Additionally, measuring components 604A, 604B, 604C, 604D, and 604E vary in size to reflect a unique amount of measurement. Measuring components 604A, 604B, 604C, 604D, and 604E have an inscription of the amount of measurement positioned within. Additionally, the measuring components protrude slightly more pronounced about the surface of football shape 602 than found in some of the other embodiments. However, the measuring components can be flush with football shape 602. Measuring components 604A, 604B, 604C, 604D, and 604E are located dispersed about football shape 602.

Figure 7:
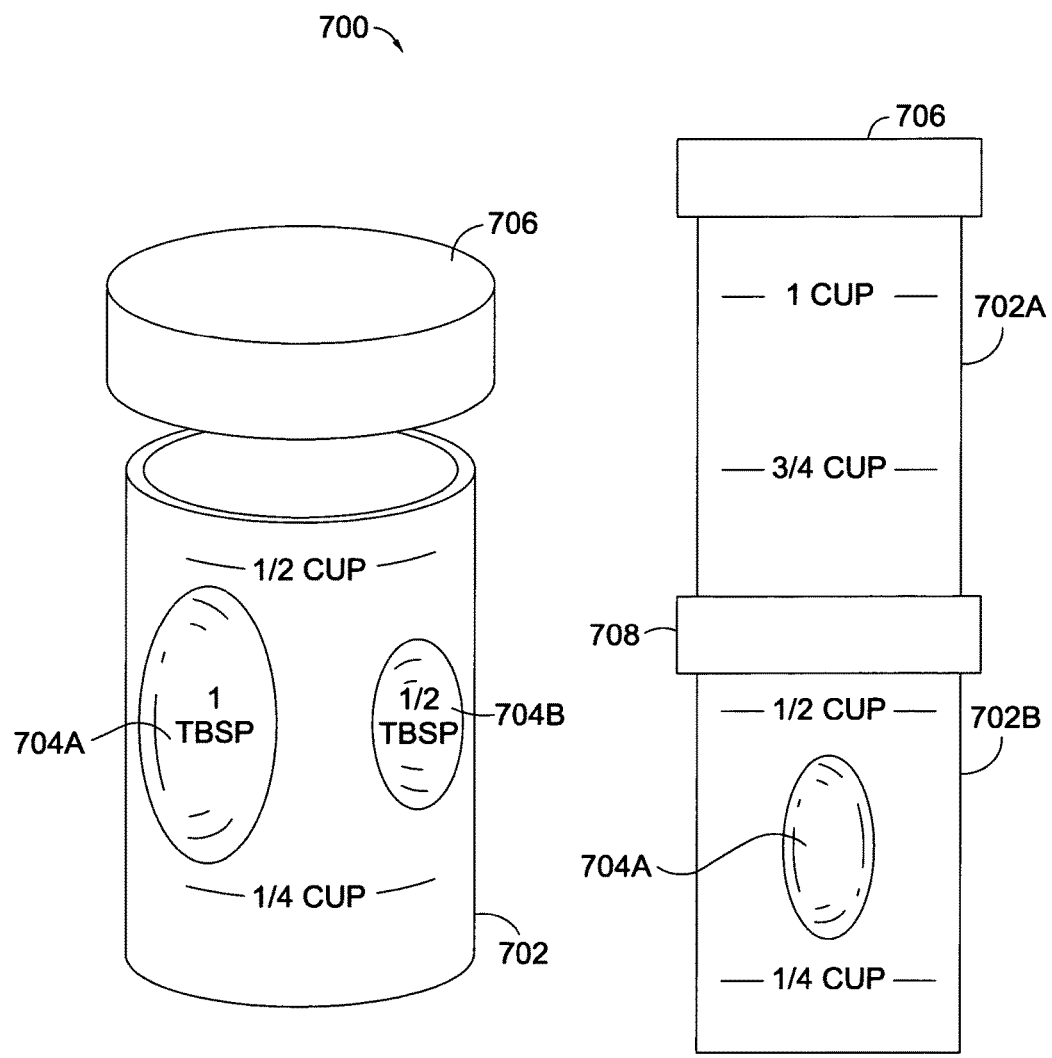
FIG. 7 is another illustration of an exemplary measuring tool with a cylindrical shape and an interlocking option.

In FIG. 7, a measuring tool 700 includes a structure 702 with a plurality of measuring components 704A and 704B. Measuring tool 700 may also include writing on the surface of structure 702. Such writing can include measurement levels. As discussed above, measuring tool 700 may have a varying number of measuring components, which can be more or less than the ones shown in FIG. 7. Additionally, measuring components 704A and 704B vary in size to reflect a unique amount of measurement. Measurement components 704A and 704B have the measurement amount of their size written to be visible to a user. Also, the measurement components may be permanently attached to structure 702. In other embodiments, the measurement components may be removable.

In some embodiments, structure 702 may be a cylindrical shape. In other embodiments, structure 702 may be a cube or a rectangular prism shape. Further, the interior of structure 702 may be hollow so that a liquid, dry ingredient, or other item may be held. Additionally, a lid 706 may be used to close or secure the top of structure 702 in measuring tool 700. As such, measuring tool 700 can be used to measure items using the interior of structure 702. A liquid or ingredient can be poured into structure 702 to an indicator, such as a 1 cup marker or other marker. Measuring tool 700 can be used as a cup shaker when lid 706 is positioned securely atop structure 702. Even further, a structure 702A can be secured to a structure 702B at connection 708. In some embodiments, connection 708 can allow a "twist off" function so that a twisting motion can connect or detach structures 702A and 702B.

While the embodiments of the invention are susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the embodiments of the invention.

The embodiments of the invention have been described in relation to an all-in-one measuring apparatus, which is intended in all respects to be illustrative rather than restrictive. Alternative embodiments will become apparent to those of ordinary skill in the art to which the invention pertains without departing from its scope.

The technology claimed is:

1. An apparatus for measuring liquids or ingredients of various sizes, comprising:
    a plurality of measuring tools comprising a plurality of measuring cups, wherein each measuring cup has a unique size relative to other measuring cups in the plurality of measuring tools, and wherein each measuring cup holds an amount equivalent to a particular volume measurement, and wherein the plurality of measuring tools has a shape selected from a group consisting of a rectangular prism, a baseball, a soccer ball, a basketball, and a football;
    the plurality of measuring cups is embedded in the surfaces of the plurality of measuring tools and located uniformly about the surfaces of the plurality of measuring tools; and
    one of the plurality of measuring tools is stackable with at least one other of the plurality of measuring tools, wherein the one of the plurality of measuring tools locks onto the at least one other of the plurality of measuring tools.

2. The apparatus of claim 1, wherein a measuring tool stays in a stationary position where a measuring cup touches a surface and acts as a support to keep the measuring tool in the stationary position.

3. The apparatus of claim 1, further comprising a type of measurement is indicated in a measuring cup.

4. The apparatus of claim 3, wherein the measuring cup is removable from a measuring tool.

5. The apparatus of claim 4, wherein an interior of the measuring tool is hollow and can store an item.

\* \* \* \* \*